(No Model.) 2 Sheets—Sheet 1.

J. G. BAKER.
SPRING GUN.

No. 343,560. Patented June 15, 1886.

Witnesses,
John Tolless
F. Norman Dixon

Inventor,
John G. Baker
By his Attorneys (No Model.) 2 Sheets—Sheet 2.

J. G. BAKER.
SPRING GUN.

No. 343,560. Patented June 15, 1886.

Witnesses
John Dolley
F. Norman Dixon.

Inventor,
John G. Baker
By his Attorneys
W. C. Strawbridge
J. Bonsall Taylor

UNITED STATES PATENT OFFICE.

JOHN G. BAKER, OF PHILADELPHIA, PENNSYLVANIA.

SPRING-GUN.

SPECIFICATION forming part of Letters Patent No. 343,560, dated June 15, 1886.

Application filed June 8, 1885. Serial No. 167,974. (No model.)

*To all whom it may concern:*

Be it known that I, JOHN G. BAKER, a citizen of the United States, residing in the city and county of Philadelphia, and State of Pennsylvania, have invented a new and useful Improvement in Spring-Guns, of which the following is a specification.

The primary object of my invention is the provision of a simple and inexpensive contrivance especially adapted for the killing of homeless cats, which animals, as a class, as is somewhat generally admitted, are at night nuisances in urban neighborhoods. The invention, however, is of course applicable for the killing of wild animals or game of various kinds.

My invention, broadly stated, comprehends an inclosed box or casing or other frame-work containing a, preferably, spring-controlled gun, the muzzle of which presents into a walled vestibule, ante-chamber, or approach to the box, the exposed floor of which vestibule is the front portion of a lever of the first order, the other portion of which is concealed within the box, and controls to set in action the discharging mechanism of the gun. It also comprehends, in connection with an apparatus of the foregoing character, the provision of a sound-deadening chamber, so that the operation of the contrivance may be comparatively noiseless.

Upon the lever-floor of the vestibule of the apparatus is placed catnip or other bait to attract the intended victim, while the nozzle or discharging-orifice through which the missile of the gun is discharged is so located as to present against the head or body of an animal stepping upon said floor to seize the bait.

An apparatus conveniently embodying a good form of my invention is represented in the accompanying drawings, and described in this specification, the particular subject-matter claimed as novel being hereinafter definitely specified.

Figure 1:
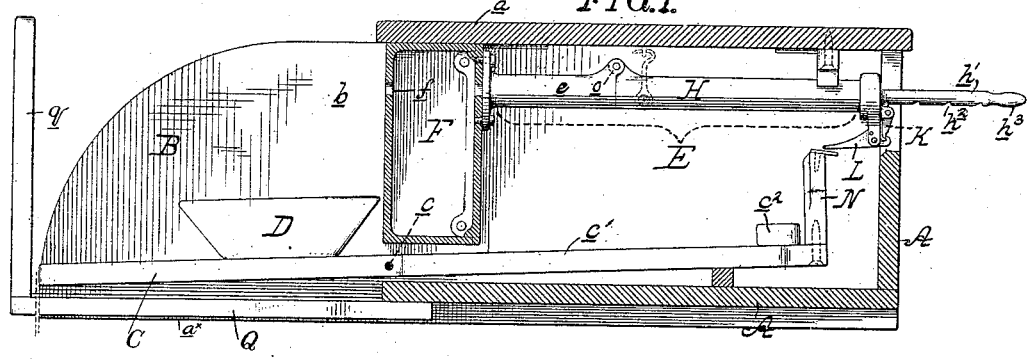
Figure 2:
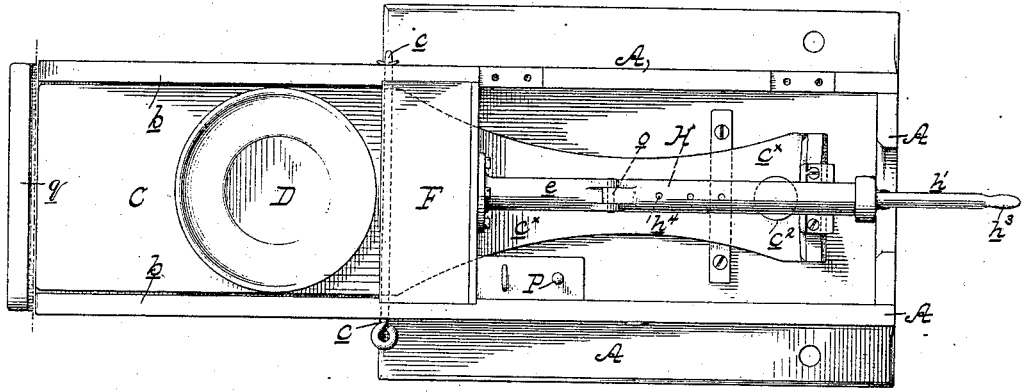
Figure 4:
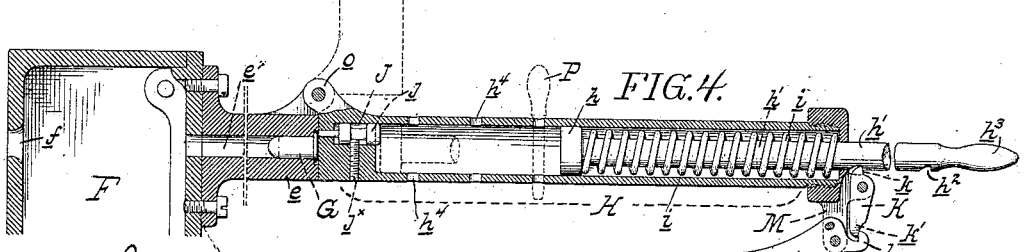
Figure 5:
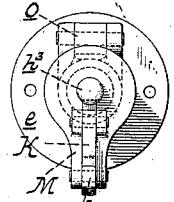
Figure 6:
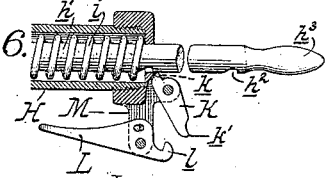
Figure 3:
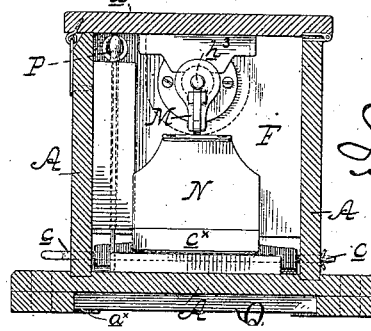
Figure 8:
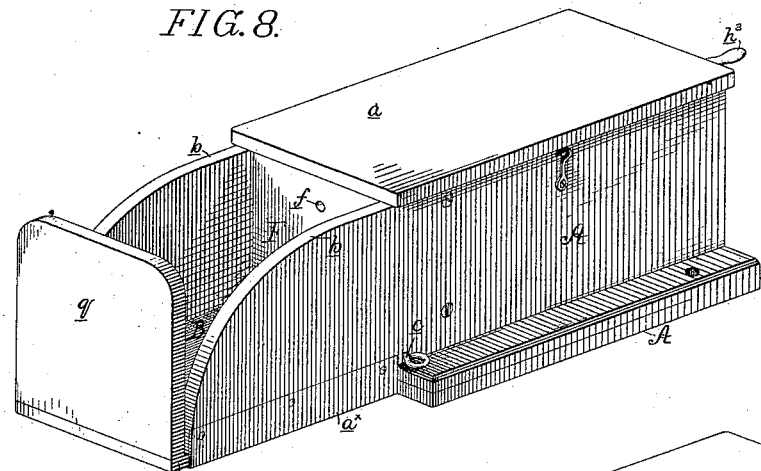
Figure 7:
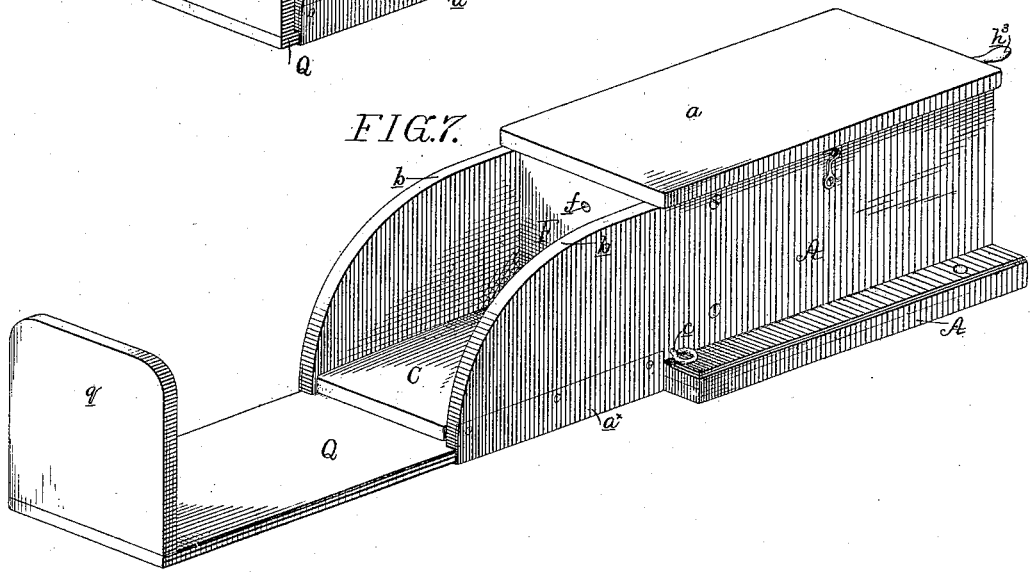
Figure 9:
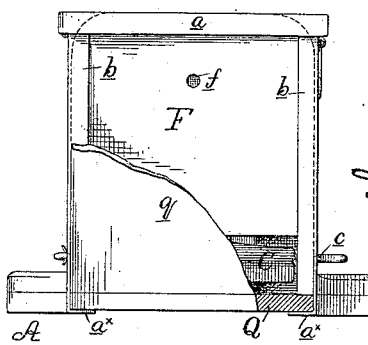

In the drawings, Figure 1 is a longitudinal vertical sectional elevation of a device conveniently embodying my improvements, the gun, trigger mechanism, and lever-floor being represented in elevation. Fig. 2 is a top plan view of the entire contrivance, the lid of the casing being removed. Fig. 3 is a transverse sectional end elevational view of the parts represented in Figs. 1 and 2, sight being taken from the right-hand end of said figure. Fig. 4 is a central vertical longitudinal sectional elevation through the sound-deadening chamber, the barrel, and the piston-chamber of the gun, the cartridge-plunger, piston-rod, piston, and trigger mechanism being represented in side elevation. In Figs. 1, 2, and 4 the gun and connections are represented in the positions which they occupy when the gun is set. Fig. 5 is an end elevational view of the gun, the parts being represented in the positions which they occupy in Fig. 4, and sight being taken from the right-hand end of said Fig. 4. Fig. 6 is a fragmentary partially sectional and partially elevational detail of certain of the parts represented in Fig. 4, the trigger mechanism, however, being represented in the position which it occupies when the trigger has been tripped. Fig. 7 is a perspective view of an extension piece or floor and vertical guard with which I for convenience equip my device, the extension-piece being pulled out to the position which it occupies when the trap is set. Fig. 8 is a similar view with the extension-piece pushed in, as when the trap is supposed to be out of action. Fig. 9 is a front sectional transverse elevational detail with a portion of the extension-piece broken away in the plane of the dotted line $x\ x$ of Fig. 8.

Similar letters of reference indicate corresponding parts.

In the drawings, A represents the casing for containing, or the frame-work for supporting, the gun, the trigger mechanism, and various operative parts of the device, which is conveniently, although not necessarily, in the form of a rectangular inclosed box provided with a hinged lid, *a*. In advance of one end of the box is what I term an "ante-chamber" or "vestibule," B, formed between side walls, *b*, which are in effect continuations of the sides of the box, and the floor of which is a pivoted board or lever, C, pivoted at *c* near the commencement of the vestibule, and extending as to a portion of its length, which I for convenience designate as *c'*, within the box.

D is a saucer for bait, placed upon the vestibule lever-floor.

E is the gun, which is conveniently a spring-gun, of the construction represented in Figs. 4, 5, and 6, and which consists, essentially, of a barrel or cartridge-chamber, $e$, fixed within the box, and the muzzle of which enters or the bore of which terminates in an air or sound-deadening chamber, F, to the immediate rear of the vestibule and within the box. This chamber F may be formed as a metal casting, or in such other manner as convenience of manufacture may dictate. The bore $e'$ of the barrel is in alignment with an aperture, $f$, or muzzle, so to speak, in the front wall of the sound-deadening chamber, through which aperture the ball of the cartridge G, Fig. 4, is discharged upon the action of the gun. The barrel of the gun is conveniently a fixture.

H is a preferably cylindriform piston-chamber, containing a piston, $h$, about the rod $h'$ of which is a coiled spring, $i$. In the forward end of the piston-chamber is a plunger-chamber, J, for containing the cartridge needle or plunger $j$, which latter is conveniently recessed, as shown, and maintained in position free for predetermined longitudinal movement by the plunger-pin $j'$. The barrel is chambered, as shown, to receive the head of the cartridge, and when a cartridge is in place, as represented in Fig. 4, the head of the plunger is exposed to the spring-piston. The piston-rod $h'$ is provided with a series of notches, $h^2$, within any one of which the nose $k$ of a trigger-lever, K, is adapted to be entered.

L is a pivoted trigger, provided with a hooked extremity, $l$, which is adapted to engage with the lower arm, $k'$, of the trigger-lever K. The trigger and trigger-lever are respectively mounted or pivoted upon a depending bracket, M, conveniently connected with the piston-chamber of the gun. It is obvious that when the handle $h^3$ of the piston-rod is pulled back the spring about said rod is compressed, and it becomes possible to engage the nose of the trigger-lever with a particular notch in the piston-rod, and after such engagement to engage the hooked extremity of the trigger with the lower arm of said trigger-lever as then engaged with the piston-rod.

When the foregoing relation of parts has been established, the discharging mechanism of the gun is set, and it is obvious that any force exerted from below upward against the free or longer arm of the trigger will so deflect the latter as to disengage its hook from the arm of the trigger-lever, and so permit the recoil of the spring to drive forward the piston against the cartridge-plunger, as indicated in dotted lines in Fig. 4, the nose of the trigger-lever in such action being deflected out of its notch in the piston-rod by the movement of said piston-rod, and in the manner represented in Fig. 6.

The force which I employ to unset the trigger mechanism is the lever-floor of the vestibule, the rear extremity of said lever being provided with what I term a "trigger-trip," N, which in the normal set of the parts, or that represented in Fig. 1, is slightly below the free arm of the trigger. The lever-floor is conveniently provided with a counter-weight, $c^2$, which is adapted to overbalance the weight of the bait or saucer therefor, and to retain that portion of the lever which is the floor of the vestibule in the position represented in Fig. 1, or slightly above the ground. The adjustment, however, is so nice that the additional weight of an ounce or two will turn the balanced lever, depress its outer or floor portion, and elevate its rear or concealed portion to an extent sufficient to cause the deflection by its trigger-trip of the trigger until the hook of the latter becomes disengaged from the arm of the trigger-lever. As experience has demonstrated that a cat or other animal seeking the bait will, in its approach to the bait, invariably place its paw either upon the lever-floor or the saucer within the vestibule, and will in so doing overcome the counterpoise of the lever-floor, it is obvious that the gun will be discharged by the act of the animal in placing the weight of its paw or body upon the lever-floor. The proportions of the device are also such that it is almost impossible for a cat or other animal to touch the floor or the bait with its paw without exposing its head or body to the muzzle of the gun. As a convenient construction, I prefer to hinge the piston-chamber to the barrel of the gun by, for instance, such a hinge as is designated O, and represented in the drawings.

As a precaution against accidental discharge of the gun during the setting of the trigger, I provide through the piston-chamber holes $h^4$, through which a safety-pin, P, can be temporarily entered while the trigger is being set and removed after it is set. Of course, if desired, the piston-chamber may be made as a fixture with the barrel, or made to screw on or off, or otherwise applied.

The mechanical details of the construction of the device may of course be varied. I have, however, represented in the drawings a convenient and cheap mode of constructing the apparatus, and one which in practice I have found efficient. Receptacles may be provided within the case for the cartridges and for the safety-pin.

In order to render the device entirely secure, a sliding or extension piece or floor, Q, may be applied to the box A, and be provided with an elevated end or target, $q$, the said extension-floor being adapted by any convenient slide or tongue-and-groove device to be drawn out after the gun is set, as shown in Fig. 7, and so that the end or target $q$ will receive the bullet in the event of the accidental discharge of the gun. When the device is not set, the extension-piece can be pushed in, as in Fig. 8.

It is proper for me to state that I do not claim or seek herein to cover the foregoing extension-piece, which was invented by John Rowbotham, and which will constitute the subject-matter of an application for patent to be filed by him.

While I have represented, and with some particularity described, a specific construction of spring-gun as an entirety, yet I desire distinctly to state that I do not restrict myself to the precise construction of gun represented and described, as it is obvious that any other form of gun may be substituted in the stead of the spring-gun represented and described, and with perhaps equal effectiveness. It is true, also, that the specific form of trigger mechanism represented and described may be modified without departing from the invention.

Having thus described my invention, I claim and desire to secure by Letters Patent—

1. The combination of the casing, the walled ante-chamber thereto, the lever-floor to the ante-chamber, the sound-deadening chamber, the gun, and the trigger mechanism, substantially as and for the purposes set forth.

2. The combination of the lever-floor provided with the trigger-trip, the trigger, the trigger-lever, the gun provided with the spring-controlled piston-rod, the plunger, the cartridge-barrel, and a casing or frame-work for supporting said several devices, substantially as and for the purposes set forth.

3. The combination, with a casing containing a lever-floor, of a spring-gun composed of the barrel, the piston-chamber, the plunger-chamber, the plunger, the spring-controlled piston, the notched piston-rod, the trigger-lever, and the trigger, substantially as set forth.

4. In combination with the casing, the sound-deadening chamber, the gun, the trigger mechanism, and the lever, substantially as set forth.

5. In combination with the casing, the sound-deadening chamber, the gun, the trigger mechanism, the lever, and the ante-chamber to which the lever forms the floor, substantially as set forth.

6. The combination, with a casing containing a lever-floor, of a gun, the barrel of which contains a piston-chamber provided with a spring-controlled piston, and with a trigger mechanism, and also provided with a plunger adjustably applied with respect to the barrel substantially as and for the purposes set forth.

7. The combination, with a casing containing a lever-floor, of a spring-gun provided with a piston-chamber, a spring-controlled piston therein, a trigger mechanism applied to said piston, and a safety-pin applied to said piston-chamber, substantially as and for the purposes set forth.

In testimony whereof I have hereunto signed my name this 4th day of June, A. D. 1885.

JOHN G. BAKER.

In presence of—
J. BONSALL TAYLOR,
JOHN JOLLEY, Jr.